March 8, 1960 E. B. MANCKE ET AL 2,927,871
CONTROL OF PICKLING BATHS
Filed March 26, 1956 7 Sheets-Sheet 2

FIG. 2

INVENTORS
Edgar B. Mancke and
Cloyd W. Shingledecker
BY R. S. A. Hlougherty
ATTORNEY

United States Patent Office 2,927,871
Patented Mar. 8, 1960

2,927,871

CONTROL OF PICKLING BATHS

Edgar B. Mancke and Cloyd W. Shingledecker, Bethlehem, Pa., assignors to Bethlehem Steel Company, a corporation of Pennsylvania Application March 26, 1956, Serial No. 573,756

7 Claims. (Cl. 134—10)

This invention relates to the control of pickling baths, and more particularly to maintenance of a uniform concentration in pickling baths of the type used in continuous pickling.

The principal object of this invention is to control the concentration of a pickling bath so that optimum pickling will be maintained at all times during the pickling operation.

Generally, in the control of pickling baths, including those of the continuous type, some form of intermittent, periodic titration has been been used to determine acid and dissolved iron concentration of the bath, and consequently the required acid additions. The control tests have been performed manually, and the hiatus between tests has usually been of such duration that considerable variation in acid content and/or dissolved solids content may occur in the bath, especially in operations such as high speed continuous strip pickling.

In most operations, where steel strip is continuously pickled, the strip enters the first of a series of pickling tanks (normally four or five) and passes at a high rate of speed from the first tank through each of the series. Upon leaving the last of the pickling tanks, the strip is water sprayed, squeegeed and then rinsed in water rinse tanks. On the basis of periodic chemical analyses for acid and iron content of the bath, concentrated acid is added to maintain acid concentration, and water is added to keep the dissolved iron content within satisfactory balance for pickling. Iron build-up in the bath retards the pickling rate. While there is no one definite location at which make-up acid must be added to the pickling bath in a continuous system, usually the acid is added in two or more tanks, water frequently being added in each of them. The bath is normally maintained at a tempereature of about 200° F. by the addition of live steam to each tank.

Because of the many variables in high speed continuous strip pickling, such as the rate of travel of the strip, surging in the tanks, overflow, introduction of steam and of water from water sprays, it can be readily seen that with the old method of periodic bath analysis, the bath could not be maintained continuously at the preferred composition for maximum rate and quality of pickling. Lack of continuous control results in high acid consumption, dissolving of excessive amounts of iron and increased pollution problems.

We have developed a method for continuous adjustment of bath composition, wherein the bath may be constantly maintained within a desired predetermined limited range of composition. We obtain this objective by the proper additions of concentrated acid and of dilute acid of a strength approaching the acid concentration of the normal working bath. Automatic additions of the two types of acid can be made in response to continuous conductivity and specific gravity measurements.

In order that our invention may be more readily understood, reference may be had to the accompanying drawings, in which.

Figure 1:
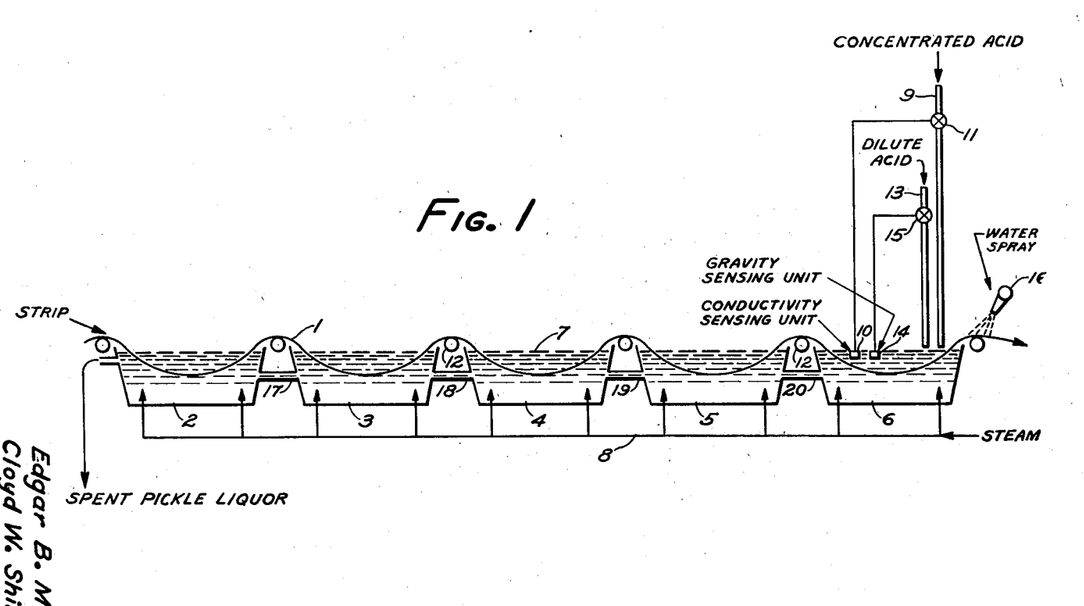
Fig. 1 is a schematic view of one modification of a continuous strip pickling system.

In Fig. 1, the steel strip 1 travels successively through tanks 2, 3, 4, 5 and 6, while pickling solution 7 flows from tank 6 successively through tanks 5, 4, 3 and 2, from whence it overflows as waste. The strip travels over carrier rolls 12 as it enters and leaves each tank. A steam line 8 is connected with each of the tanks 2 to 6 for maintenance of the proper temperature in the pickling bath. Concentrated acid is introduced into tank 6 through pipe 9, and valve 11. To this valve is connected an electrical conductivity sensing instrument 10. Dilute acid is introduced into tank 6 through pipe 13 and valve 15. To this valve is connected a specific gravity sensing instrument 14. Water spray for rinsing the pickled strip is emitted from nozzles 16.

While in Fig. 1 dilute acid enters the tank through pipe 13, in actual practice water and acid may enter the bath from separate pipes in amounts which will supply the correct amount of dilute acid in the bath.

It is to be noted that in the embodiment of the invention as depicted in Fig. 1, we have placed the equipment for introducing make-up acid and dilute acid at one tank only, tank 6, as we have found that adding make-up acid at only one point in the system allows for easier control of the bath. However, this is not necessary, for if desired, acid may be introduced into the other tanks as well. Because each of the tanks 2 to 6 is interconnected at pipes 17, 18, 19 and 20, there is some constant intermixture of solution from tank to tank. While the exact location in the system at which concentration control tests are made is largely a matter of choice, in this embodiment such tests are made in tank 6. While we have shown, in the drawings, the sensing instruments in the actual tank bath, as an alternative these instruments may be placed in a separate test tank, withdrawing pickle liquor continuously from the pickling tank to the test tank for testing purposes, and then returning the liquor to the pickling tank.

Figure 3:
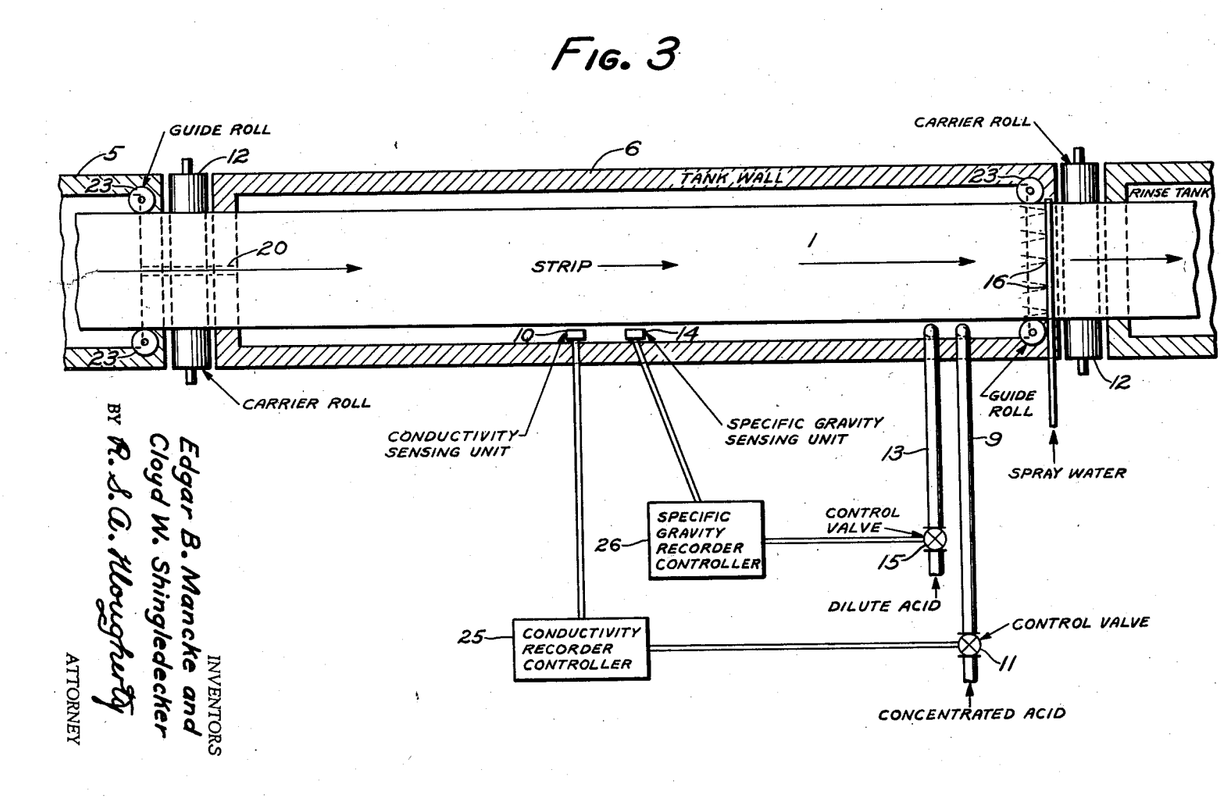
Fig. 3 is a diagrammatic plan view of a pickling tank and control instruments.

As shown in Fig. 3, the strip 1 is centered in tank 6 so that sensing instruments 10 and 14, and acid feed pipes 9 and 13, may be placed in the bath 7 out of contact with the strip. The strip is held in position by means of guide rolls 23.

Optimum pickling conditions will be determined by the speed at which the steel strip travels through the bath, the width of the strip, and to some extent the nature of the strip material, the temperature of the bath, and the acid and iron concentration. After deciding on the optimum concentrations necessary to give uniform pickling for a given set of conditions, narrow tolerances should be established for concentration variation and the control instruments set up in accordance with these tolerances.

Figure 2:
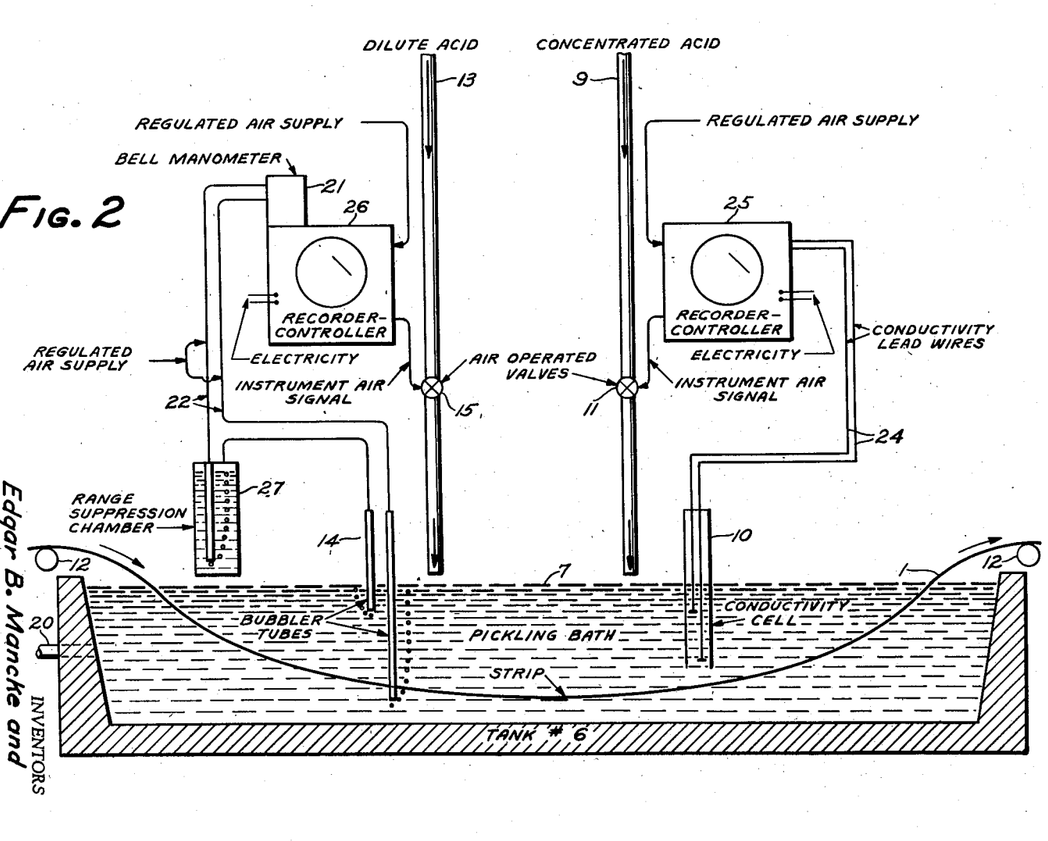
Fig. 2 is a diagrammatic representation of the pickle liquor control equipment of Fig. 1.

Referring now to Fig. 2, and assuming that a pickling bath 7 of desired concentration has been prepared and is in use, make-up acid may be introduced through pipe 9. This acid is concentrated sulfuric (66° Bé.) and is added to maintain proper acid concentration in the bath. An electrical conductivity cell 10, such as a cell of the type having platinum electrodes connected to an arm of a Wheatstone bridge, is placed in the bath and connected to valve 11 through a recorder-controller instrument 25. The combination of cell 10 and the recorder-controller may be set for any desired limited range of acid concentration of the bath, so that air operated valve 11 is opened or closed depending on whether acid must be added or acid additions should be discontinued. Pipe 13 carries dilute sulfuric acid which in this case is of a concentration approximating the optimum acid concentration of the bath. A pair of bubbler tubes 14 is installed in the bath to detect changes in the specific gravity in the bath. The bubbler tubes are set so as to register within a narrow range of gravity change in a fashion similar to that of the conductivity cell, and are connected through a recorder-controller 26 with air operated valve 15. When the gravity reaches a predetermined maximum, valve 15 automatically opens, permitting flow of dilute acid into the bath. Introduction of the dilute acid into the bath lowers the specific gravity, and when the gravity reaches a predetermined minimum, as measured by the bubbler tubes, the valve 15 automatically closes and flow of dilute acid is discontinued. To insure greater accuracy in measuring gravity, a range suppression chamber 27 may be used in conjunction with the bubbler tubes, as will be explained.

In measuring the electrical conductivity, which is influenced by the acid concentration of the bath, the conductivity cell, having two platinum electrodes, is connected as one arm of a Wheatstone bridge and measures the resistance of the acid solution. Specific resistance of an electrolyte may be defined as the resistance in ohms of a column of electrolyte one square centimeter in cross section and one centimeter deep. Specific conductivity is the reciprocal of specific resistance. In referring to conductivity measurements herein, it should be noted that actual measurements are made of the resistance of the solution. As specific conductivity is equal to the cell constant divided by ohms resistance, the recording instrument may be calibrated for specific conductivity. An alternating current is used in the bridge circuit to minimize polarization of the electrode.

The current to the recording instrument may be translated into movement of a recording pen. The chart on the recorder is electrically driven, hence the pen will make a continuous record on the chart of the specific conductivity of the pickling acid. The recorder should be equipped with an adjustable set point, which can be set so that it corresponds to the specific conductivity required to insure the desired acid concentration of the pickling bath. The deviation of the recorder pen from the set-point would then be a measure of the degree to which the bath varies from the desired acid concentration. This deviation would then be used as the control for concentrated acid addition, and based on the deviation permitted, would operate a valve controller. The controller, taking the signal from the recorder, would translate the signal into a pneumatic signal of sufficient pressure to operate the air controlled valve 11 of Fig. 2. While in this example air control is used, the controller and valve may be of any well-known electrically or pneumatically operated type. With pneumatic control, the degree to which the valve opens can be made to depend upon the pressure transmitted by the controller, which in turn is regulated by the deviation of the recorder pen from the set-point. The air-operated valve controls the amount of strong acid flowing into the bath, and maintains the acid concentration of the bath.

In Fig. 2, the bubbler tubes 14 represent two air-bubble pipes of different submerged length. The open ends of each pipe must be completely submerged in the pickling bath. Changes in the pressure readings between the two tubes indicate changes of specific gravity. In this manner the change in specific gravity in the bath, which is influenced by the build-up of ferrous sulfate, may be determined.

The effect of the constant liquid level difference may be eliminated by providing a supplementary range suppression chamber 27 of Fig. 2 employing a dip tube with an effective submergence equal to the level difference between the two main dip tubes. The suppression chamber tube is filled with a reference liquid having a density which approaches the minimum density of the tank liquid. With this arrangement, all changes in differential pressure are due to changes in specific gravity.

The two pressure lines 22 from the bubbler tubes and range suppression assembly are connected to a bell manometer 21. The differential in pressure causes a weighted bell to float in a chamber of mercury. The greater the differential in pressure, the higher will be the level at which the bell floats. The float is linked to a pen arm employed in the recorder. A movement of the bell causes a movement in the recorder pen. The recorder chart is electrically driven, hence the pen will make a continuous record on the chart of the specific gravity of the pickling bath. The recorder contains a set point that may be set for a specific gravity which corresponds to the desired iron content of the pickling bath. The deviation of the recorder pen from the set point is then an indication of the specific gravity variation of the bath from the desired gravity, the gravity at any given point being influenced by the iron sulfate in solution.

A controller can be made to operate in conjunction with the recorder in the same manner as has been described in connection with the conductivity measurements. Similarly too, the controller can be made to actuate air operated valve 15, said valve controlling the flow of required dilute acid into the bath.

In the foregoing description we have used conductivity as an indication of acid concentration, and specific gravity as an indication of dissolved iron content. Actually, conductivity is influenced by both acid concentration and dissolved iron content, although acid concentration usually exerts the larger influence. Likewise, specific gravity is influenced by both acid concentration and iron content, in this case, iron content usually being the larger influence. It should be pointed out that the manner of controlling can be reversed, that is, acid concentration may be controlled by means of specific gravity and iron content may be controlled by conductivity. Other means may also be usde to measure the bath concentrations, for example, by continuous titration.

Both controllers may also contain other features such as those commonly called proportional band, reset action, and rate or derivative action. These features may be employed to supply corrective action where there is lack if instrument sensitivity or a process lag.

The expression proportional band refers to a band which equals the percentage of the distance on the recorder which the pen must deviate from the set point to cause the controller to transmit the maximum air pressure and cause the air controlled valve to fully open. The band may be adjusted at any value between a small and large increment, so that slight or large deviations from the desired concentration will cause the valve to fully open. The degree to which a valve opens within a set band will be in proportion to the relative position of the recorder pen within the proportional band. Hence, the valve may be opened to a position which is neither completely open nor completely closed, and would correspond to throttling control.

Should the recording pen of the recorder-controller tend to stray off the control path due to a process load change, use of what is known as reset action will cause an additional change in air pressure to the air controlled valve, resulting in the pen resetting to the control point. Thus any sustained deviation of the pen from the control point caused by proportional control will be corrected by reset action. The frequency of reset action may be adjusted to various time intervals.

Rate, or derivative, action causes changes to be made in the air pressure to be transmitted from the controller to the valve, so that the valve is moved in proportion to the acceleration of the change in deviation from the set point. Thus, if the pen is some distance from the set point, the rate action will cause more air pressure to be transmitted from the controller to the valve than the proportional responses demand, and hasten the return of the pen to the set point. Similarly, if the pen is near the set point, the rate action will cause less air pressure to be transmitted from the controller to the valve than the proportional responses demand, and prevent the pen from over shooting the set point. The degree of rate action may be adjustable.

Figure 4:
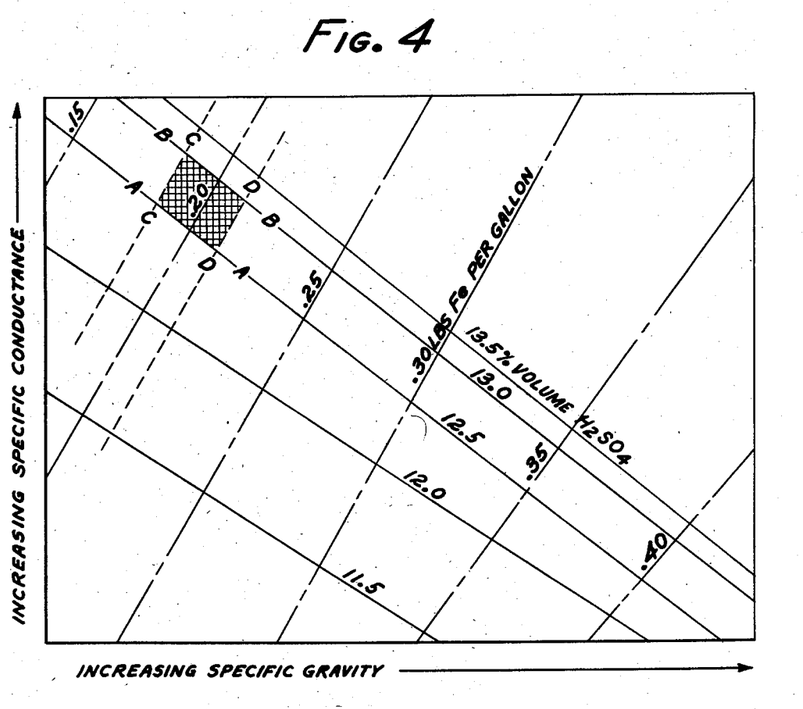
Fig. 4 is a graph showing the control area as the shaded portion, for one example of a pickling bath.

The inter-relationship between specific conductance, specific gravity, acid concentration and dissolved iron concentration can be more clearly shown by referring to Fig. 4. In preparing the graph of Fig. 4, a number of pickling baths of various compositions were prepared. Each of the baths was raised to the desired pickling temperature and measurements made for specific conductance and specific gravity. The baths were then altered by adding iron in the form of wire, to simulate pickling, and make-up acid, either concentrated or dilute. Upon the collection of considerable data it was possible to prepare Fig. 4 wherein the specific gravity is plotted as the abscissa and the specific conductivity as the ordinate. The superimposed lines passing from the upper left corner to the lower right, i.e., lines designated as AA, BB and those approximately parallel thereto, represent constant acid content expressed in volume percent, line BB representing a higher acid content than line AA. The lines approximately perpendicular to AA and BB represent constant iron content lines, expressed on a weight per unit volume basis. Here line DD represents a higher iron content than line CC.

The graph represents approximate relationships for bath compositions of the order of 11.5% to 13.5% by volume as 100% $H_2SO_4$ and 0.15 lb. to 0.40 lb. of iron per gallon. Similar relationships apply with other compositions, although the slopes of the constant iron and constant acid lines would be slightly different from those shown in Fig. 4.

From Fig. 4 it is apparent that any pickling bath composition can be defined by a combination of any two of the four variables plotted. For example, if it were desired to maintain the pickling bath of a composition within that represented by the area enclosed by AA, BB, CC and DD, which could be that desired in tank 6 of Fig. 1, specific gravity and specific conductance limits could be chosen to accomplish this. Depending on the selection of these limits, it is quite possible to maintain control of the bath within an even smaller area than the shaded portion of Fig. 4. A discussion of Figures 5, 6 and 7 will explain just how this can be accomplished.

Figure 5:
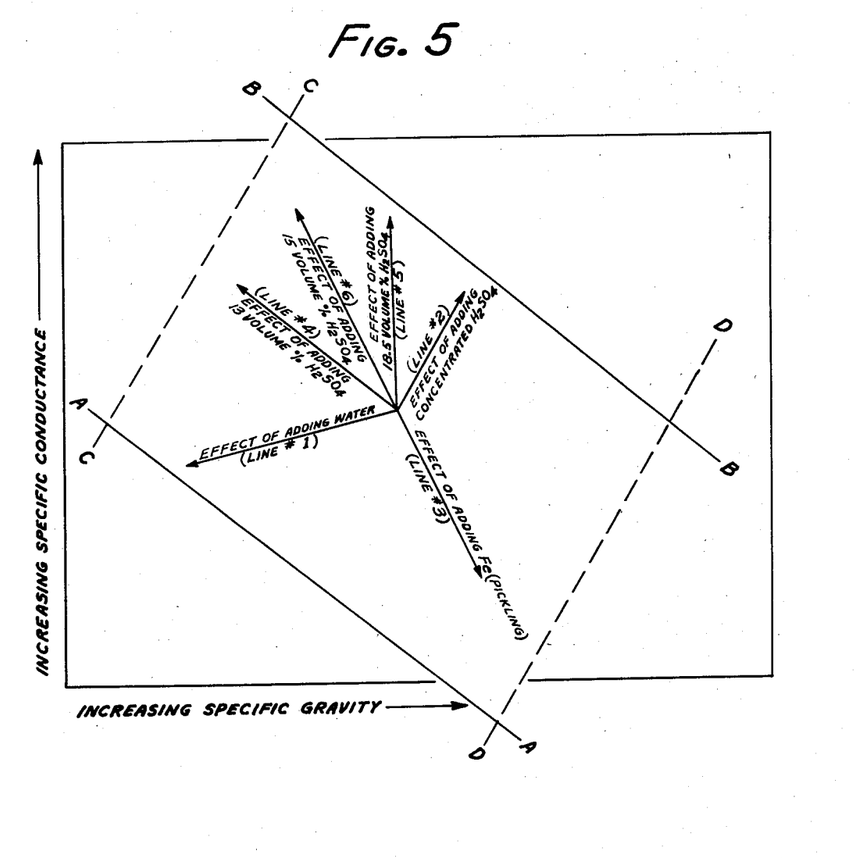
Fig. 5 is a graph showing an expanded view of the area bounded by lines AA, BB, CC and DD of Fig. 4, and includes plotted vectors indicating how additions to the bath influence its specific gravity and specific conductance.

An expanded section of the area bounded by lines AA, BB, CC and DD of Fig. 4 is shown in Fig. 5. The approximate compositions included in this area are of the order of 12.5% to 13.0% by volume as 100% $H_2SO_4$ and 0.185 lb. to 0.21 lb. of iron per gallon. The plotted vectors of Fig. 5 show how additions to the bath influence the specific gravity and specific conductance of the bath. For example, if to a bath of suitable composition, shown as the central point of the vectors in Fig. 5, water is added, the specific gravity will decrease sharply and the specific conductivity slightly. If strong acid is added, both conductivity and gravity increase. If iron is added, that is to say, if steel is pickled, the conductivity decreases and the specific gravity increases. If diluted acid is added as is shown by vector 4, the gravity decreases and conductivity increases, and as shown by comparing it with vector 5, the direction of the lines are dependent upon the concentration of acid added. Thus, theoretically it would be possible to add an acid of suitable composition to directly counter-oppose the effect of pickling, as indicated by vector 6. Such a condition would be very desirable, for the bath would be held within very narrow ranges of composition. However, as a practical matter, addition of acid of exactly line 6 composition is not feasible since there are other additions to the bath which are not entirely uniform. For example, the spray water and steam dilution may vary somewhat, and upset the exact counteraction of vector 3 by vector 6. Therefore, it is desirable to add dilute acid which when mixed with the spray water and water from steam dilution would have a composition represented by lines falling within the area between vectors 1 and 6, permitting the composition to approach that of 6 as nearly as possible but avoiding the risk of passing over to the right of it into compositions represented by the area between vectors 6 and 2. If this area is entered there would be no way of correcting for the resultant high acidity, if the only subsequent additions to the bath are strong acid and dilute acid of the compositions referred to herein.

When we refer to concentrations of dilute treating agent addition in the claims, we mean the concentration of mixtures formed by the dilute treating agent (the dilute acid of the example) and the water introduced into the system by the sprays and by steam dilution and other ways.

Figure 6:
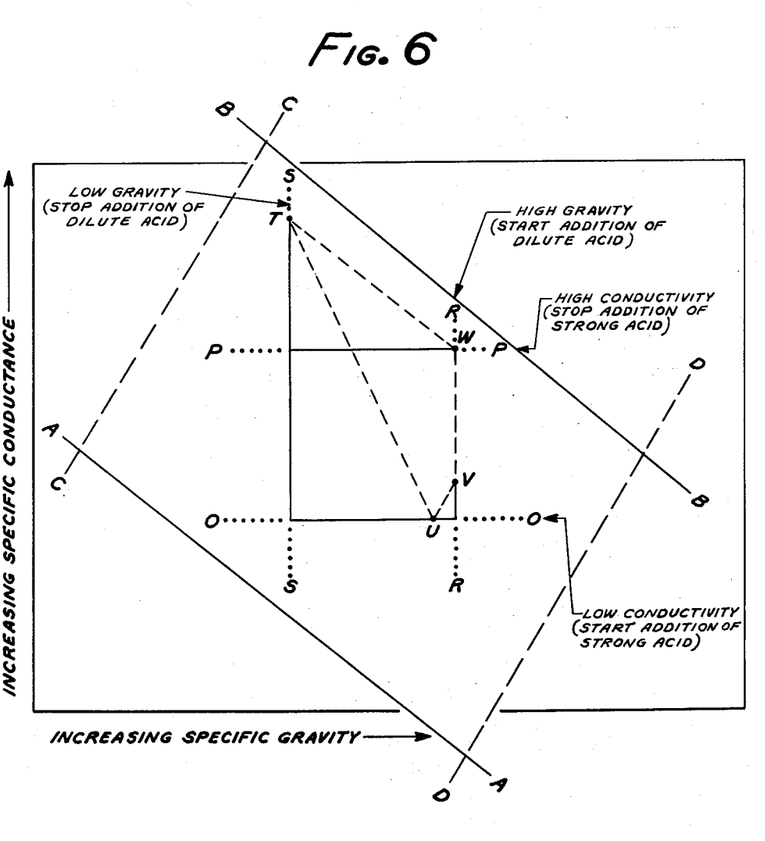
Fig. 6 is another graph showing an expanded view of the area bounded by AA, BB, CC and DD of Fig. 4, showing the control area when on-off type control of the bath additions is used.

One method of control, that of on-off control, is shown graphically in Fig. 6, and indicates how control of the bath is confined to some more limited area within the boundaries of the previously considered section bounded by lines AA, BB, CC and DD. For the purposes of discussion of Fig. 6 it is to be assumed that the valves on the concentrated acid and dilute acid lines operate in on and off positions only, and not in intermediate positions, and that the valves are sized approximately correctly. The instrumentation would be arranged so that when the conductivity of the bath is low, as represented by line OO, strong acid would be added, and when the conductivity of the bath is high, as represented by the line PP, the strong acid would be turned off. In addition, when the specific gravity of the bath is high, as represented by the line RR, the dilute acid would be turned on and when the specific gravity of the bath is low, as represented by the line SS, the dilute acid would be turned off.

By choosing control limits represented by the lines OO, PP, RR and SS, pickling bath compositions within the area encompassed by lines AA, BB, CC and DD can be readily attained. As a starting bath, a bath may be assumed having a composition designated by T in Fig. 6. As the steel in the bath is pickled, the iron content of the bath increases and the acid content decreases. During pickling the specific gravity and specific conductivity relationships will be altered as shown by the line TU. It should be noted that the slope of the line TU corresponds to line 3 of Fig. 5. The pickling operation will proceed without change until the specific conductance falls to that indicated by line OO, or the point represented by U on line TU. As previously explained, when the line OO is reached, strong acid commences to flow and continues to flow until the specific conductance represented by line PP is reached. Referring again to point U on line OO, and assuming that pickling has ceased at this point, control would then proceed in a path designated by line UV, which line has the approximate slope of line 2 of Fig. 5. When the high specific gravity represented by the line RR is reached at point V, dilute acid will begin to flow. At this point both dilute and concentrated acid are flowing and the control path will be approximately along the line VW. Upon reaching point W on line PP, the strong acid addition is discontinued, while dilute acid continues to flow. The direction of the control path then changes to that of WT, since it is along these lines that control proceeds when dilute acid only is being added. At point T, the flow of dilute acid addition is discontinued, for the control line has reached line SS, the lowest predetermined specific gravity limit. The cycle is then repeated, going from T to U to V to W and back to T again.

While in the above cycle the point T was chosen as the starting point composition of the bath, any location within the control range could be chosen for the initial composition.

Additionally, in the above explanation, it was assumed that when point U was reached and strong acid began flowing, pickling stopped. Actually pickling would continue, in which case we would proceed approximately along line OO until the intersection of RR has been reached, at which time the path would proceed in approximately a vertical direction along line RR to point W, thence to T as explained.

In the above description we have assumed that when the specific gravity and specific conductance of the bath attain values represented by lines OO, RR, PP and SS, that the control valves would be activated immediately. As a practical matter, of course, instrument sensitivity and process lags will influence this operation to some extent. This can be compensated for by adjusting the control points for specific gravity and specific conductance.

It is apparent from the above description that at all times the bath composition could be held well within the desired limits as represented by the area bounded by lines AA, BB, CC and DD of Fig. 6.

Figure 7:
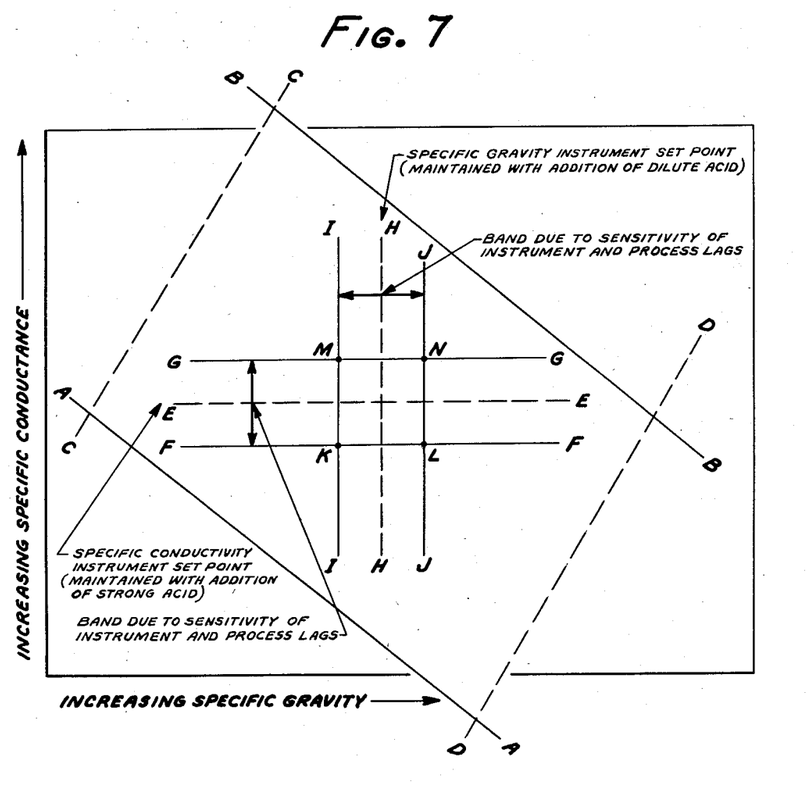
Fig. 7 is another graph showing an expanded view of the area bounded by AA, BB, CC and DD of Fig. 4, showing the control area when throttling type control of the bath additions is used.

Fig. 7 depicts graphically a method of line, or throttling, control, which may be used with our method as an alternative to be described on-off control method. In this case the instruments would be set to maintain one specific conductance value and one specific gravity value of the bath. In Fig. 7 line HH represents the specific gravity selection and line EE that of specific conductance. The control would be such that it would attempt to maintain the composition of the bath at all times at that point represented by the intersection of the two lines EE and HH. However, for practical considerations, such line control could not be attained but rather control would be within bands represented in the drawing by the lines II and JJ for specific gravity and GG and FF for specific conductance. If control is maintained within these limits, the pickling bath composition would always be within the previously selected desired area of control, that area bounded by lines AA, BB, CC and DD.

It is to be understood that this description in no way limits the practice of our invention to the use of continuous pickling of steel strip. The process is applicable to batch operations and can be employed on objects other than strip.

We claim:

1. In a process wherein a ferrous metal workpiece is submitted to the chemical action of a bath containing an aqueous solution of a sulfuric acid treating agent of predetermined concentration and wherein ferrous sulfate is formed by reaction between said workpiece and said treating agent, the method of maintaining in balance said bath which comprises determining the concentration of said acid by measuring the conductivity of the bath and when said conductivity falls below a predetermined limit, automatically adding concentrated sulfuric acid to the bath in an amount sufficient to increase the conductivity of the bath to a predetermined limit, determining the concentration of said sulfate by independently measuring the specific gravity of the bath, and when said specific gravity rises above a predetermined limit, automatically adding to the bath a solution of sulfuric acid in a concentration approximately equal to the predetermined treating agent concentration and in an amount sufficient to reduce the specific gravity of said bath to a predetermined limit.

2. In a process wherein a metal workpiece is submitted to the chemical action of an acid pickling bath containing an aqueous solution of an acid of predetermined concentration, and wherein a soluble reaction product is formed by reaction between said workpiece and said acid, the method of maintaining in balance said bath which comprises separately and continuously measuring the acid content and the reaction product content of the bath and when the measurements of said contents deviate from a predetermined range, automatically adding concentrated acid and water in amounts necessary to maintain the acid content and the reaction product content within said predetermined range.

3. In a process wherein a metal workpiece is submitted to the chemical action of an acid pickling bath containing an aqueous solution of an acid of predetermined concentration, and wherein a soluble reaction product is formed by reaction between said workpiece and said acid, the method of maintaining in balance said bath which comprises separately and continuously measuring the conductivity and the specific gravity of the bath and thereby determining the concentration of said acid and said reaction product, and when the measurements thus determined deviate from a predetermined range, automatically adding concentrated acid and water in amounts necessary to maintain the conductivity and the specific gravity within said predetermined range.

4. In a process wherein a metal workpiece is submitted to the chemical action of an acid pickling bath containing an aqueous solution of an acid of predetermined concentration, and wherein a soluble reaction product is formed by reaction between said workpiece and said acid, the method of maintaining in balance said bath which comprises continuously measuring the acid content of the bath, and when said acid content falls below a predetermined limit, automatically adding concentrated acid to the bath in an amount sufficient to increase the acid content of the bath to a predetermined limit, continuously measuring the reaction product content of the bath, and when said reaction product content rises above a predetermined limit, automatically adding water and acid to the bath to form a solution having a concentration not greater than the said predetermined solution concentration in an amount sufficient to reduce the reaction product content of said bath to a predetermined limit.

5. In a process wherein a metal workpiece is submitted to the chemical action of an acid pickling bath containing an aqueous solution of an acid of predetermined concentration, and wherein a soluble reaction product is formed by reaction between said workpiece and said acid, the method of maintaining in balance said bath which comprises continuously measuring the conductivity of the bath to determine the acid concentration, and when said conductivity falls below a predetermined limit, automatically adding concentrated acid to the bath in an amount sufficient to increase the conductivity of the bath to a predetermined limit, continuously measuring the specific gravity of the bath to determine the concentration of the reaction product, and when said specific gravity rises above a predetermined limit, automatically adding water and acid to the bath to form a solution having a concentration not greater than the said predetermined solution concentration in an amount sufficient to reduce the specific gravity of said bath to a predetermined limit.

6. In a process wherein a metal workpiece is submitted to the chemical action of an acid pickling bath containing an aqueous solution of an acid of predetermined concentration, and wherein a soluble reaction product is formed by reaction between said workpiece and said acid, the method of maintaining in balance said bath which comprises measuring the acid content of the bath, and when said acid content falls below a predetermined limit, automatically adding concentrated acid to the bath in an amount sufficient to increase the acid content of the bath to a predetermined limit, measuring the reaction product content of the bath, and when said reaction product content rises above a predetermined limit, automatically adding water and acid to the bath, the total concentration of said water and acid being not greater than the said predetermined solution concentration, in an amount sufficient to reduce the reaction product content of said bath to a predetermined limit.

7. In a process wherein a metal workpiece is submitted to the chemical action of an acid pickling bath containing an aqueous solution of an acid of predetermined concentration, and wherein a soluble reaction product is formed by reaction between said workpiece and said acid, the method of maintaining in balance said bath which comprises separately measuring the acid content of the bath, and when said acid content falls below a predetermind limit, automatically adding concentrated acid to the bath in an amount sufficient to increase the acid content of the bath to a predetermined limit, separately measuring the reaction product content of the bath, and when said reaction product content rises above a predetermined limit, automatically adding water and acid to the bath, the total concentration of said water and acid being not greater than the said predetermined solution concentration in an amount sufficient to reduce the reaction product content of said bath to a predetermined limit.

References Cited in the file of this patent

UNITED STATES PATENTS

| | | |
|---|---|---|
| 1,450,023 | Edelman | Mar. 27, 1923 |
| 1,576,001 | Olden | Mar. 9, 1926 |
| 1,912,997 | Parker | June 6, 1933 |
| 1,944,243 | Kegl | Jan. 23, 1934 |
| 2,155,854 | Barnes | Apr. 25, 1939 |
| 2,382,648 | Martin | Aug. 14, 1945 |
| 2,505,756 | Koning | May 2, 1950 |
| 2,513,562 | Holuba | July 4, 1950 |
| 2,697,673 | Rice | Dec. 21, 1954 |
| 2,721,562 | Irvine | Oct. 25, 1955 |
| 2,755,669 | Beard | July 24, 1956 |